US012637103B2

(12) United States Patent
Jang

(10) Patent No.: US 12,637,103 B2
(45) Date of Patent: May 26, 2026

(54) METHOD AND APPARATUS WITH AUTONOMOUS DRIVING DECISION LEARNING

(71) Applicant: SAMSUNG ELECTRONICS CO., LTD., Suwon-si (KR)

(72) Inventor: Dohyun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 18/604,604

(22) Filed: Mar. 14, 2024

(65) Prior Publication Data

US 2025/0145174 A1     May 8, 2025

(30) Foreign Application Priority Data

Nov. 3, 2023     (KR) ........................ 10-2023-0151089

(51) Int. Cl.
*B60W 60/00*          (2020.01)
*G06F 40/20*          (2020.01)
(52) U.S. Cl.
CPC .......... *B60W 60/001* (2020.02); *G06F 40/20* (2020.01); *B60W 2420/403* (2013.01); *B60W 2420/408* (2024.01); *B60W 2554/20* (2020.02); *B60W 2555/60* (2020.02)
(58) Field of Classification Search
CPC .... B60W 40/02; B60W 60/00; B60W 60/001; B60W 2554/20; B60W 2555/60; G60W 2554/20; B60Y 2400/3015; B60Y 2400/3017; G06F 40/20; G06N 3/042; G06N 3/08

USPC .......................................................... 701/23
See application file for complete search history.

(56) References Cited

U.S. PATENT DOCUMENTS

| | | | |
|---|---|---|---|
| 10,269,242 B2 | 4/2019 | Ahmad et al. | |
| 10,766,487 B2 | 9/2020 | Likhachev et al. | |
| 2019/0291726 A1* | 9/2019 | Shalev-Shwartz | ........................... B60W 30/0956 |
| 2019/0317520 A1* | 10/2019 | Zhang | .................. G05D 1/0214 |
| 2023/0135659 A1* | 5/2023 | Wu | ........................ G06N 3/044 706/21 |
| 2023/0145208 A1* | 5/2023 | Bobu | ..................... G06N 20/00 706/12 |
| 2023/0282350 A1* | 9/2023 | Devore | .................. G16H 40/67 |

(Continued)

FOREIGN PATENT DOCUMENTS

| | | | | |
|---|---|---|---|---|
| CA | 3102846 C | * | 4/2023 | ......... H04L 43/0882 |
| CN | 107908671 A | | 4/2018 | |

(Continued)

*Primary Examiner* — Atul Trivedi
(74) *Attorney, Agent, or Firm* — NSIP Law

(57)          ABSTRACT

Provided is a method of learning a driving-decision algorithm. The method of learning a driving-decision algorithm for a vehicle includes: receiving a dataset related to driving from a database in which a driving scenario is stored; obtaining a first output by inputting the dataset into a first large language model (LLM), wherein the first output includes an inference of the first LLM based on the dataset; based on the first output, training a decision-trainer and a behavior-and-trajectory planner; generating a second LLM by updating the first LLM based on a result of the training; and generating a third LLM by updating the second LLM based on the trained decision-trainer and based on a selected traffic rule.

20 Claims, 9 Drawing Sheets

200

(56) References Cited

U.S. PATENT DOCUMENTS

| | | | | |
|---|---|---|---|---|
| 2023/0351772 | A1* | 11/2023 | Poltoraski | B60W 40/04 |
| 2023/0398686 | A1* | 12/2023 | Tozeto Ramos | B25J 9/1664 |
| 2023/0405820 | A1* | 12/2023 | Huang | B25J 9/1612 |
| 2023/0418287 | A1* | 12/2023 | Cristache | G07C 9/00174 |
| 2024/0174264 | A1* | 5/2024 | Wray | B60W 30/09 |
| 2024/0182082 | A1* | 6/2024 | Chen | B60W 60/0011 |
| 2024/0303504 | A1* | 9/2024 | Xu | G06N 3/084 |
| 2024/0410705 | A1* | 12/2024 | Pham | G06N 3/045 |
| 2024/0420418 | A1* | 12/2024 | Wu | G06F 40/30 |
| 2025/0061340 | A1* | 2/2025 | Turuvekere Sreenivas | |
| | | | | G06N 3/096 |
| 2025/0103868 | A1* | 3/2025 | Sieniawski | G06N 3/0475 |
| 2025/0124640 | A1* | 4/2025 | Lorraine | G06T 7/97 |
| 2025/0136130 | A1* | 5/2025 | Shetty | B60W 60/001 |
| 2025/0136134 | A1* | 5/2025 | Shetty | B60W 50/14 |
| 2025/0145174 | A1* | 5/2025 | Jang | B60W 60/001 |
| 2025/0148911 | A1* | 5/2025 | Chandraker | G06N 3/08 |
| 2025/0153735 | A1* | 5/2025 | Li | G06V 20/56 |
| 2025/0198796 | A1* | 6/2025 | Orendovici | G01C 21/387 |
| 2025/0209330 | A1* | 6/2025 | Yu | G06N 3/082 |
| 2025/0209676 | A1* | 6/2025 | Huang | G06V 10/82 |
| 2025/0209696 | A1* | 6/2025 | Jiang | G06T 3/02 |
| 2025/0232557 | A1* | 7/2025 | Osep | G06V 10/764 |
| 2025/0236289 | A1* | 7/2025 | Gunbatar | B60W 30/09 |
| 2025/0259388 | A1* | 8/2025 | Lin | G06T 3/4038 |
| 2025/0265848 | A1* | 8/2025 | Sapra | G06V 20/588 |
| 2025/0278670 | A1* | 9/2025 | Skinner | G06N 7/01 |

FOREIGN PATENT DOCUMENTS

| | | | | | |
|---|---|---|---|---|---|
| CN | 117725150 A | * | 3/2024 | | G06F 40/35 |
| DE | 102025100538 A1 | * | 7/2025 | | G06V 20/58 |
| EP | 4517696 A1 | * | 3/2025 | | G06F 30/12 |
| KR | 10-2018-0068262 A | | 6/2018 | | |
| KR | 10-1992416 B1 | | 6/2019 | | |
| WO | WO-2023114904 A2 | * | 6/2023 | | G06N 3/006 |
| WO | WO-2025227135 A1 | * | 10/2025 | | G06N 3/0464 |

* cited by examiner

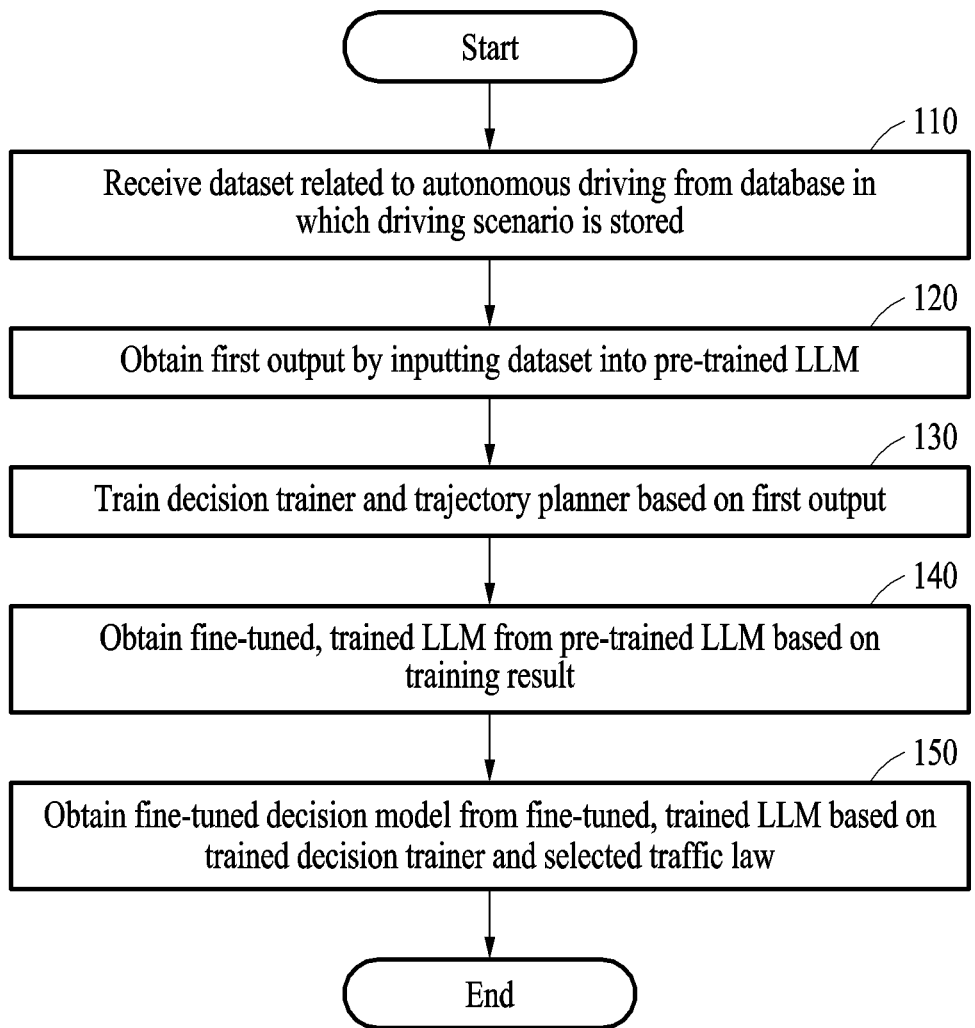

Start

110

Receive dataset related to autonomous driving from database in which driving scenario is stored

120

Obtain first output by inputting dataset into pre-trained LLM

130

Train decision trainer and trajectory planner based on first output

140

Obtain fine-tuned, trained LLM from pre-trained LLM based on training result

150

Obtain fine-tuned decision model from fine-tuned, trained LLM based on trained decision trainer and selected traffic law End

METHOD AND APPARATUS WITH AUTONOMOUS DRIVING DECISION LEARNING

CROSS-REFERENCE TO RELATED APPLICATIONS

This application claims the benefit under 35 USC § 119(a) of Korean Patent Application No. 10-2023-0151089, filed on Nov. 3, 2023, in the Korean Intellectual Property Office, the entire disclosure of which is incorporated herein by reference for all purposes.

BACKGROUND

1. Field

The following description relates to a method and apparatus with autonomous driving decision learning.

2. Description of Related Art

An autonomous driving systems are employed in platforms such as cars, aircrafts, and robots to operate them autonomously to perform tasks without real-time human instructions. The implementations and operations of most autonomous driving systems may be generally divided into three stages: recognition, decision, and control. The recognition stage involves recognizing a surrounding environment using a sensor mounted to a platform. The decision stage involves determining behavior of the platform by using recognized surrounding environment to generate a driving path. The control stage controls the platform to move along the generated driving path.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of learning a driving-decision algorithm for a vehicle includes: receiving a dataset related to driving from a database in which a driving scenario is stored; obtaining a first output by inputting the dataset into a first large language model (LLM), wherein the first output includes an inference of the first LLM based on the dataset; based on the first output, training a decision-trainer and a behavior-and-trajectory planner; generating a second LLM by updating the first LLM based on a result of the training; and generating a third LLM by updating the second LLM based on the trained decision-trainer and based on a selected traffic rule.

The behavior-and-trajectory planner may be configured to output a control signal for controlling a vehicle using, as an input, the first output and scene information about a setting of the vehicle.

The training of the behavior-and-trajectory planner may include: extracting a learning score using a rule-based evaluator for evaluating a control result of the vehicle controlled by the control signal; and based on determining that the learning score is less than a first threshold value, updating the learning score by updating the behavior-and-trajectory planner.

The training of the decision-trainer may include: extracting an estimated score for the first output using the first output as an input; and updating the decision trainer based on determining that the estimated score is less than the learning score and that an estimation error of the estimated score for the learning score is greater than a second threshold value.

The generating of the second LLM may include, based on determining that the learning score is less than the first threshold value, updating the first LLM.

The obtaining of the first output includes encoding the dataset to a scene information feature vector and a traffic-rule feature vector.

The method may further include: training an object-of-interest explorer by receiving information about an object in a surrounding of the vehicle.

The method may further include: training a decision-basis-law extractor that is configured to output a traffic rule that provided a basis for an output of the second LLM and a basis for an output of the third LLM.

The dataset may include scene information and a traffic rule corresponding to the scene information.

An output of the third LLM may be provided to the trained behavior-and-trajectory planner using, as an input, sensor data of a sensor of the vehicle, and the updated behavior-and-trajectory planner may be configured to control the vehicle by generating a control signal.

In another general aspect, an electronic device includes: one or more processors; and a memory storing instructions configured to cause the one or more processors to: receive a dataset related to driving from a database in which a driving scenario is stored; obtain a first output by inputting the dataset into a first large language model (LLM), where the first output includes an inference of the first LLM based on the dataset; based on the first output, train a decision-trainer and a behavior-and-trajectory planner; generate a second LLM by updating the first LLM based on a result of the training, obtain a second LLM from the first LLM; and generate a third LLM by updating the second LLM based on the trained decision trainer and based on a selected traffic law.

The behavior-and-trajectory planner may be configured to output a control signal for controlling a vehicle using, as an input, the first output and scene information about a setting of a vehicle in which the electronic device is included.

The instructions may be further configured to cause the one or more processors to: extract a learning score using a rule-based evaluator for evaluating a control result of the vehicle controlled by the control signal; and based on a determination that the learning score being less than a first threshold value, update the learning score by updating the behavior-and-trajectory planner.

The instructions may be further configured to cause the one or more processors to: extract an estimated score for the first output using the first output as an input; and update the decision trainer based on a determination that the estimated score is less than the learning score and that an estimation error of the estimated score for the learning score is greater than a second threshold value.

The instructions may be further configured to cause the one or more processors to, based on a determination that the learning score is less than the first threshold value, update the first LLM.

The instructions may be further configured to cause the one or more processors to encode the dataset to a scene information feature vector and a traffic law feature vector.

The instructions are further configured to cause the one or more the processors to train an object-of-interest explorer by receiving information about a surrounding object of an autonomous vehicle.

The instructions may be further configured to cause the one or more processors to train a decision-basis-law extractor that is configured to output a traffic rule that provided a basis for an output of the second LLM and a basis for an output of the third LLM.

An output of the third LLM may be provided to an updated behavior-and-trajectory planner using, as an input, sensor data of a sensor of a vehicle in which the electronic device is included, and the updated behavior-and-trajectory planner may be configured to control the vehicle by generating a control signal.

In another general aspect, a vehicle includes: one or more processors; a memory storing instructions configured to cause the one or more processors to: display, by a display of the vehicle, a user interface for controlling the autonomous vehicle; execute a driving-decision algorithm of the vehicle; receive a dataset related to driving of the vehicle from a database in which a driving scenario is stored; obtain a first output by inputting the dataset into a first large language model (LLM), wherein the first output includes an inference of the first LLM based on the dataset; based on the first output, train a decision trainer and a behavior-and-trajectory planner; generate a second LLM by updating the first LLM based on a result of the training; and generate a third LLM by updating the second LLM based on the trained decision-trainer and based on a selected traffic rule.

Other features and aspects will be apparent from the following detailed description, the drawings, and the claims.

BRIEF DESCRIPTION OF THE DRAWINGS

FIG. 1 illustrates an example of learning a driving decision algorithm, according to one or more embodiments.

Figure 2:
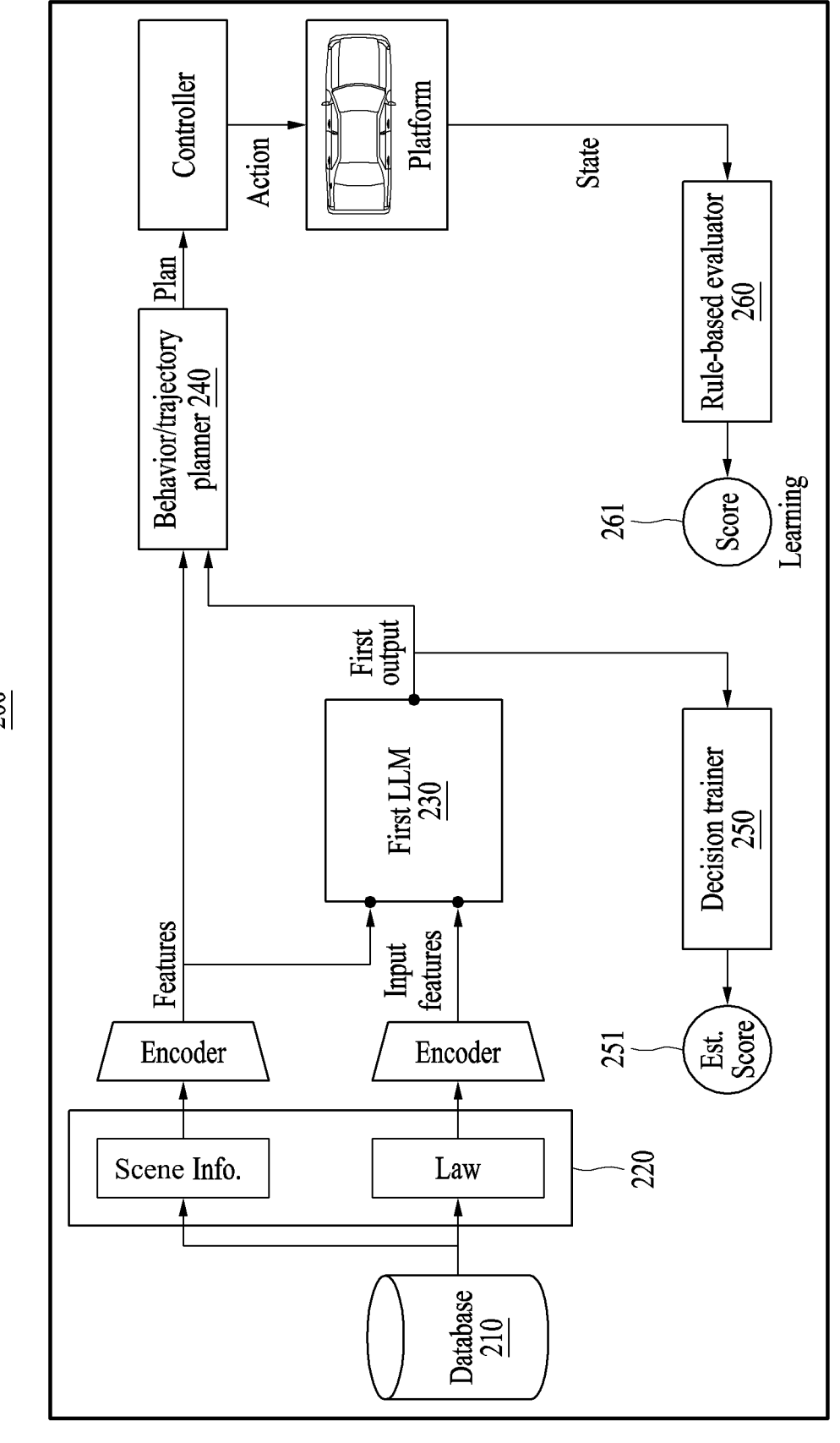
FIGS. 2 and 3 illustrate examples of learning a driving decision algorithm, according to one or more embodiments.

Throughout the drawings and the detailed description, unless otherwise described or provided, it may be understood that the same or like drawing reference numerals refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

An autonomous vehicle may be required to have a direct understanding and application of road traffic laws in order to make a driving decision. For example, an autonomous vehicle may need to know whether the timing, setting, and path of movement would violate a traffic rule. A driving decision may involve a behavior plan and a trajectory plan to implement the behavior plan. The behavior plan may determine/indicate a behavior such as lane-keeping, lane-changing, overtaking, yielding, and stopping. Based on the determined behavior, the trajectory plan may generate a trajectory of the autonomous vehicle that follows the determined behavior. In this decision-behavior determining process, the autonomous vehicle may need to prioritize adherence to traffic laws not only in the road traffic environment (e.g., traffic signals, signs, and lanes) but also rules about interacting with surrounding vehicles.

Traditionally, a rule-based algorithm and a learning-based algorithm are primarily used for making driving decisions. A rule-based algorithm generally expresses given environmental information mathematically and verifies compliance with traffic laws through analogous rules defined by equations (e.g., a decision tree algorithm). A learning-based algorithm may involve training a deep neural network with a vast amount of expert data and then applying real-time data of a given environment to the deep neural network which infers, per its training, behavior similar to what an expert would take in the given environment. The expert training data may reflect compliance with traffic laws, thereby enabling the trained deep neural network to possess the ability to infer driving decisions that comply with the traffic laws.

To implement a rule-based algorithm, a developer may be required to express all traffic laws mathematically/logically and design corresponding driving techniques mathematically. For the learning-based algorithm, it may be necessary to conduct deep neural network training with training cases that comprehensively reflect the traffic laws, including training data on various exceptional cases and expert data that adequately covers the various exceptional cases.

Moreover, in order to apply revised traffic laws to an existing rule-based algorithm, the rule-based algorithm may need to be modified to redefine equations, whereas an already-trained learning-based algorithm may need to be retrained with training data that excludes some previously learned content and that includes some new training data that reflects the revised traffic laws. Additionally, because traffic laws vary across regions, a same traffic scenario may require different driving responses in different regions. In sum, for a rule-based algorithm, it may be necessary to consider traffic laws of each region and express the laws using different/revised equations (deterministic logic). For a learning-based algorithm, data may need to be acquired and trained separately for each region.

FIG. 1 illustrates an example method of learning a driving decision algorithm, according to one or more embodiments.

Figure 3:
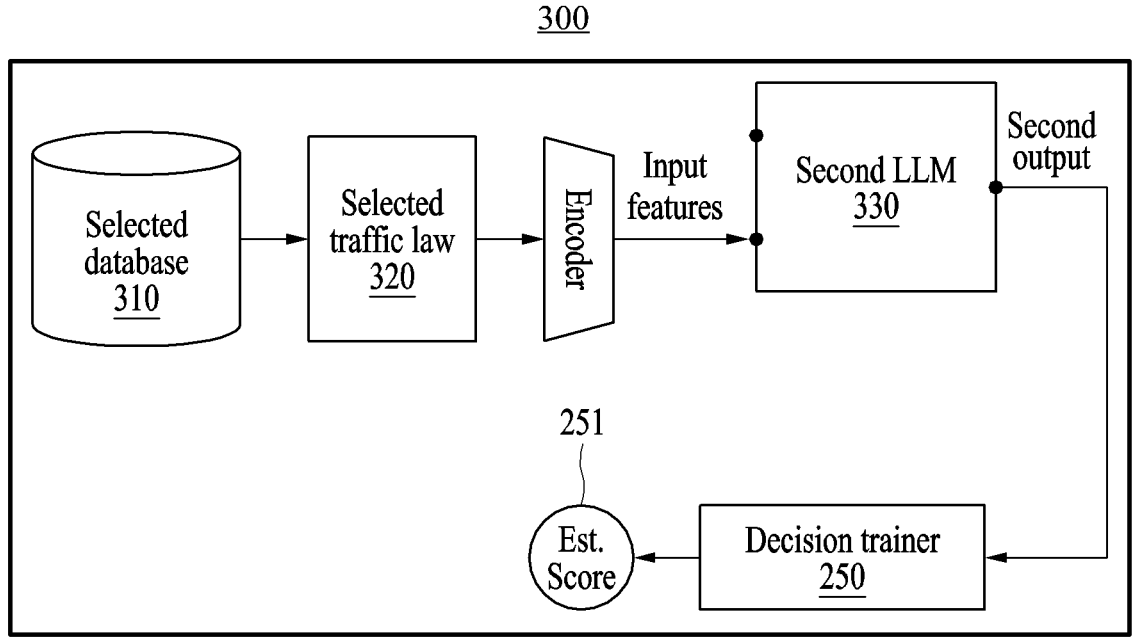

For ease of description, operations 110 to 150 are described as being performed by an electronic device and/or a processor illustrated in FIGS. 2 and 3. However, operations 110 to 150 may be performed by any suitable electronic device in any suitable system.

FIGS. 2 and 3 illustrate examples of learning a driving decision algorithm, according to one or more embodiments. As will be described, among other things, in some embodiments, the learning of the driving decision algorithm may involve different aspects of learning, depending on the training data. When a sample of training data includes both scene information and a driving law information, a language model may be trained based on both pieces of data. When a sample of training data includes scene information but not law information, the language model may be trained based on the scene information. When a sample of training data includes law information but not scene information, the language model may be trained based on the law information (e.g., using self-learning).

As illustrated in FIGS. 2 and 3, one or more blocks and a combination of the blocks may be implemented by a special-purpose hardware-based computer that performs a predetermined function or by computer instructions executed by processing hardware possibly in combination with special-purpose hardware.

Referring to FIG. 2, a processor 930 may perform a first tuning process 200 for a first large language model (LLM) 230. A process of tuning the first LLM 230 (hereinafter, "first tuning process 200") to understand traffic laws may include tuning the first LLM 230 to become a second LLM 330, where the tuning is performed using a behavior-and-trajectory planner 240, a decision trainer 250, and a rule-based evaluator 260, and where the tuning is based on a dataset received from a database 210 in which a driving scenario 220 is stored.

Referring to FIG. 3, the processor 930 may perform a second tuning process 300 of training the second LLM 330 (hereinafter, "second tuning process 300") to learn designated traffic laws. The second tuning process 300 may include tuning the second LLM 330 to become a third LLM 430 using the decision trainer 250 based on a dataset received from a selected database 310 in which a selected traffic law 320 is stored. Although the term "law" is used herein, the term generally refers to any possible rule, formal or informal. That is, "law" is used herein for convenience of description, but the actual information need not be, in the legal sense, a "law", and merely represents any driving rule which is merely a decision-making constraint.

In operation 110, the processor 930 may receive a dataset related to driving (e.g., autonomous or assisted) from the database 210 in which the driving scenario 220 is stored. Driving scenario data (e.g., the driving scenario 220) may include scene information and a traffic law related the scene information (e.g., a scene and a rule applicable to the scene). For example, the scene information may include map data, e.g., 2D or 3D data describing roads, objects, road conditions, etc.

Before training an LLM, the processor 930 may obtain a digitized traffic law (in various possible, forms discussed below) and be connected to the database 210 in which scene information corresponding to an obtained legal document is stored. Scene information may include sensor data from a sensor (e.g., a camera, a light detection and ranging (Li-DAR), a radar, etc.) mounted in an autonomous vehicle and vehicle state data. Incidentally, although description herein refers to "autonomous vehicle", embodiments and examples described herein are not limited to autonomous vehicles. For example, the embodiments and examples may be used for providing driving alerts to a human driver, for driver assisted driving, or for other applications. The sensor data may be obtained through a vehicle or a simulator on which the sensor is mounted. Digital traffic laws documents stored in the database 210 may contain the latest laws currently in effect and include text, tables, images, and the like (or any rules for which learning is desired, whether legal or not, for example, a corporate policy, a user's driving preference, etc.). When an amendment to a statue is made, the amendment may be added as an update to the database 210 to perform additional training.

In operation 120, the processor 930 may obtain a first output by inputting the dataset into the first LLM 230. To that end, in some examples the processor 930 may encode the dataset through an encoder to convert the dataset into a scene information feature vector and a traffic law feature vector (each might have its own respective encoder), from which the LLM 230 infers the first output.

The first LLM 230, which may be pre-trained (hereinafter, "first LLM 230"), may receive various natural language inputs, understand the meaning, intention, and context of input sentences, and output a proper corresponding result. The scene information feature vector and traffic law feature vector may be input into the first LLM 230. The scene information feature vector may also be input into a behavior-and-trajectory planner 240.

In operation 130, the processor 930 may train the decision trainer 250 and the behavior-and-trajectory planner 240 based on the first output (of the LLM 230). The behavior-and-trajectory planner 240 may use the first output and the scene information as an input to infer and output a control signal for controlling a vehicle.

The processor 930 may extract a learning score 261 using a rule-based evaluator 260 that evaluates a control result of the vehicle controlled by the control signal (e.g., against a ground truth result). When the learning score 261 is less than a first threshold value, the processor 930 may update the learning score 261 by updating the behavior-and-trajectory planner 240.

For example, it may be assumed, as an example, that the driving scenario 220 corresponds to a situation in which the autonomous vehicle turns right. There may be a law related to possibly requiring a vehicle to come to a complete stop considering state(s) of pedestrian signals and pedestrians on a crosswalk when the vehicle turns right. When making a right turn, there may be four options related to pedestrian signals and the presence or absence of pedestrians (two options for on/off pedestrian signal multiplied by two options for present/absent pedestrian presence). The behavior-and-trajectory planner 240 may output the control signal by receiving the first output from the first LLM 230 (inferred when the LLM 230 which receives laws related to a right turn and the scene information related to a right turn, possibly encoded as feature maps). The control signal may control driving of the autonomous vehicle through a controller, and a measured/sensed driving result of the autonomous vehicle may be input into the rule-based evaluator 260. The rule-based evaluator 260 may extract the learning score 261 of the behavior-and-trajectory planner 240 by comparing proper driving examples to driving results of actual driving of a vehicle for the four options related to a right turn.

It may be assumed, for example, that the learning score 261 ranges from 0 to 100 and the first threshold value, which serves as a criterion for retraining the behavior-and-trajectory planner 240, is 95. When the learning score 261 of the driving result of the autonomous vehicle related to a right turn is 85, the processor 930 may provide feedback on the driving result. In other words, the processor 930 may identify shortcomings in the proper driving examples and driving results of the autonomous vehicle and update the behavior-and-trajectory planner 240. The processor 930 may update the learning score 261 (e.g., generate a new learning score) by again performing the above-described process after the behavior-and-trajectory planner 240 have been updated. When the updated/new learning score 261 is less than the first threshold value (e.g., 95), the processor 930 may again update the behavior-and-trajectory planner 240 through the above-described process. In this way, the processor 930 may repeatedly update the behavior-and-trajectory planner 240. When the learning score 261, which is also repeatedly updated, is greater than the first threshold value (e.g., 95), the processor 930 may complete the updating for the behavior-and-trajectory planner 240.

The processor 930 may also use the first output as an input to extract an estimated score 251 for the first output. When the estimated score 251 is less than the learning score 261 and an error (e.g., difference) between (i) the learning score 261 and (ii) the estimated score 251 is greater than or equal to a second threshold value, the processor 930 may update the decision trainer 250, as discussed next (i.e., when the estimated score 251 is not sufficiently close to the learning score 261).

As in the example described above, for explanation, assume again that the driving scenario 220 corresponds to the example situation described above, where the autonomous vehicle turns right. The decision trainer 250 may receive the first output of the first LLM 230. The decision trainer 250 may output the estimated score 251 for the first output. As in the example described above, when the learning score 261 is 85 and the estimated score 251 is 70, the processor 930 may update the decision trainer 250 in a way that ensures that the estimated score 251 of the decision trainer 250 becomes identical to (or close to) the learning score 261. In other words, when the behavior-and-trajectory planner 240 is repeatedly updated and the learning score 261 increases, the processor 930 may repeatedly update the decision trainer 250 in a way that ensures the estimated score 251 becomes identical/close to the increased learning score 261. In the example, the second threshold value is 3. In conclusion, in the example, when the learning score 261 reaches 95 (and is therefore greater than or equal to the first threshold value), the decision trainer 250 may beneficially undergo repeated updates until the estimated score 251 also reaches 95 (or close to 95). Alternatively, the processor 930 may repeatedly update the decision trainer 250 until the estimated score 251 is greater than 92 such that an estimated error set as the second threshold value (e.g., a 3-point difference) is satisfied.

In operation 140, the processor 930 may obtain a second LLM 330 from the first LLM 230 based on a training result. Although referred to as a different language model, the second LLM 330 may be implemented as a version or derivation of the first LLM 230, insofar as some parameters (e.g., weights) of the first LLM 230 may be changed, thus leading to the second LLM 330. Nonetheless, the second LLM 330 may have same structure, hyperparameters, and some weights in common with the first LLM 230.

When the learning score 261 is less than the first threshold value, the processor 930 may update the first LLM 230.

As in the example described above, when training is performed such that the learning score 261 and the estimated score 251 increase as a result of updating the decision trainer 250 and the behavior-and-trajectory planner 240, the first output, which is input into both the decision trainer 250 and the behavior-and-trajectory planner 240, may also be improved. Thus, the first LLM 230 may also be repeatedly updated. In other words, the first LLM 230 may be updated such that the improved first output may be extracted whenever the decision trainer 250 and the behavior-and-trajectory planner 240 are updated. Thereafter, when the update of the decision trainer 250 and the behavior-and-trajectory planner 240 is completed, the update of the first LLM 230 is also completed. An LLM after the update is referred to as a second LLM 330 that is fine-tuned and trained (hereinafter, "second LLM 330"). In other words, the second LLM 330 may be an LLM in which the parameters of the first LLM 230 are fine-tuned (i.e., an updated version of the first LLM 230).

In operation 150, the processor 930 may obtain a third LLM from the second LLM 330 based on the decision trainer 250 that is trained and the selected traffic law 320 (possibly apart from any scene-based training).

The selected traffic law 320 may differ from the previously learned general road traffic laws in that the selected traffic law 320 may be a traffic law for which sufficient scene information has not yet been obtained. For example, the selected traffic law 320 may be a traffic law that has been revised or newly issued, resulting in some differences from the previously learned general road traffic laws. Or, the selected traffic law 320 may be a traffic law of a new region. In this example, data on sufficient scene information (e.g., a driving image, a sign, the presence or absence of pedestrians, sensor data, etc.) corresponding to the selected traffic law 320 may not yet have been obtained. Therefore, the processor 930 may train the second LLM 330 using the selected traffic law 320 without scene information.

Thus, the processor 930 may generate the estimated score 251 for a second output of the second LLM 330 regarding the selected traffic law 320 using the decision trainer 250 trained in the process described above (but not using scene information). The processor 930 may update the second LLM 330 in a way that maximizes the estimated score 251 for the second output. The processor 930 may determine an update completion timing (or cutoff condition/time) based on a user input and perform training in a way that maximizes the estimated score 251 through self-supervised learning.

Self-supervised learning is a type of representation learning that aims to obtain a reasonable representation from unlabeled data. A model may be trained by autonomously selecting what may be used as a target within an input without labels. Therefore, self-supervised learning may be referred to as a pretext task. Self-supervised learning may be performed through an intra-sample prediction scheme (predicting one part through another part within a single data sample) or an inter-sample prediction scheme (predicting a relationship between data samples within a batch).

In conclusion, when the processor 930 determines that the estimated score 251 has reached a maximum value from repeatedly updating the second LLM 330 and concludes (stops) the updates, the second LLM 330 that is finally updated may be referred to as a fine-tuned decision third LLM 430 (hereinafter, "third LLM 430") (e.g., the third LLM 430 of FIG. 4).

Figure 4:
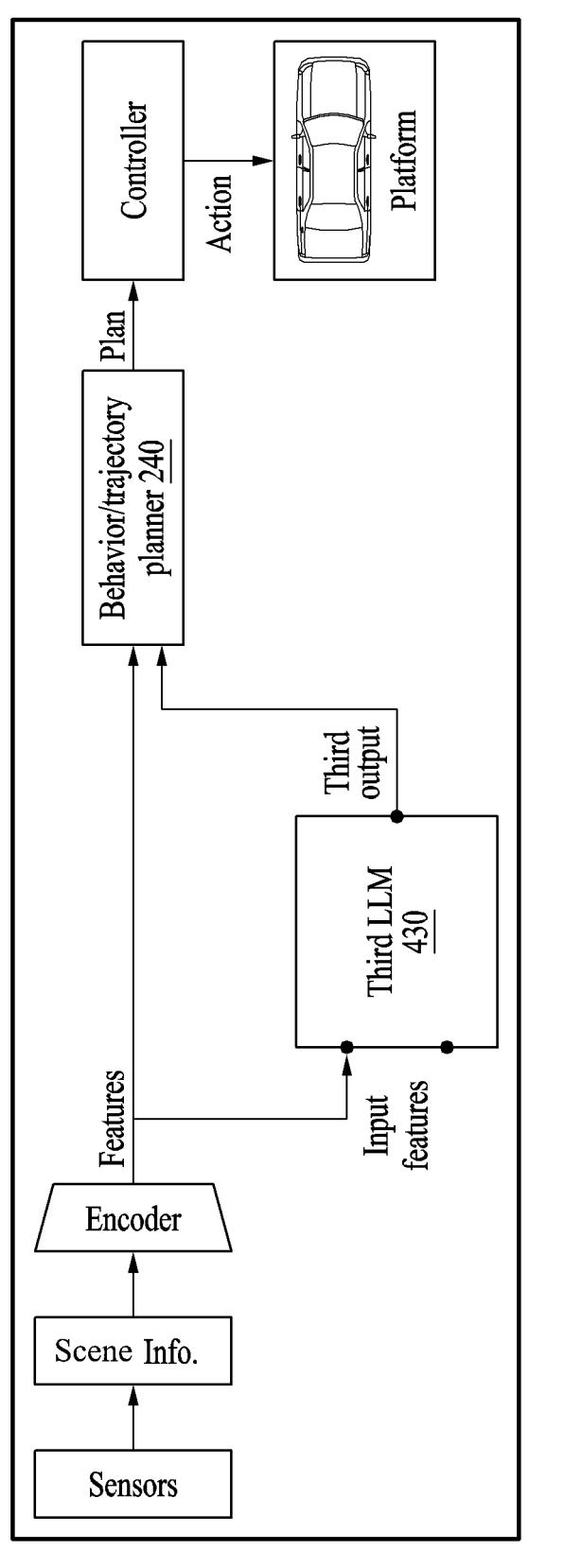
FIG. 4 illustrates an example of controlling an autonomous vehicle, according to one or more embodiments.

FIG. 4 illustrates an example process of controlling an autonomous vehicle, according to one or more embodiments.

The description provided with reference to FIGS. 1 to 3 is generally applicable to FIG. 4.

Referring to FIG. 4, an autonomous vehicle may be controlled through a control process 400 including the third LLM 430.

The processor 930 may control the autonomous vehicle using sensor data of the autonomous vehicle, the third LLM 430, and the behavior-and-trajectory planner 240, which is updated, in real time.

The third LLM 430 may use the sensor data of the autonomous vehicle (e.g., in the form of encoded features derived from sensor-based scene information) as an input to generate an output (e.g., third output) that is transmitted to the behavior-and-trajectory planner 240 (that has been previously updated), and the previously-updated behavior-and-trajectory planner 240 may control the autonomous vehicle by generating a control signal. As with the other LLMs, the third LLM 430 may be configured to also receive driving laws/rules, but in this case the inference (third output) of the LLM is generated without that information.

The previously-updated behavior-and-trajectory planner 240 may have been previously/finally updated and trained as described with reference to FIG. 2. In other words, the processor 930 may control the autonomous vehicle by receiving only the sensor data of the autonomous vehicle (possibly as encoded features) as an input using the third LLM 430 that has been finally updated and trained and the behavior-and-trajectory planner 240 that is updated (here, "only" refers to not using rule/law information).

Figure 5:
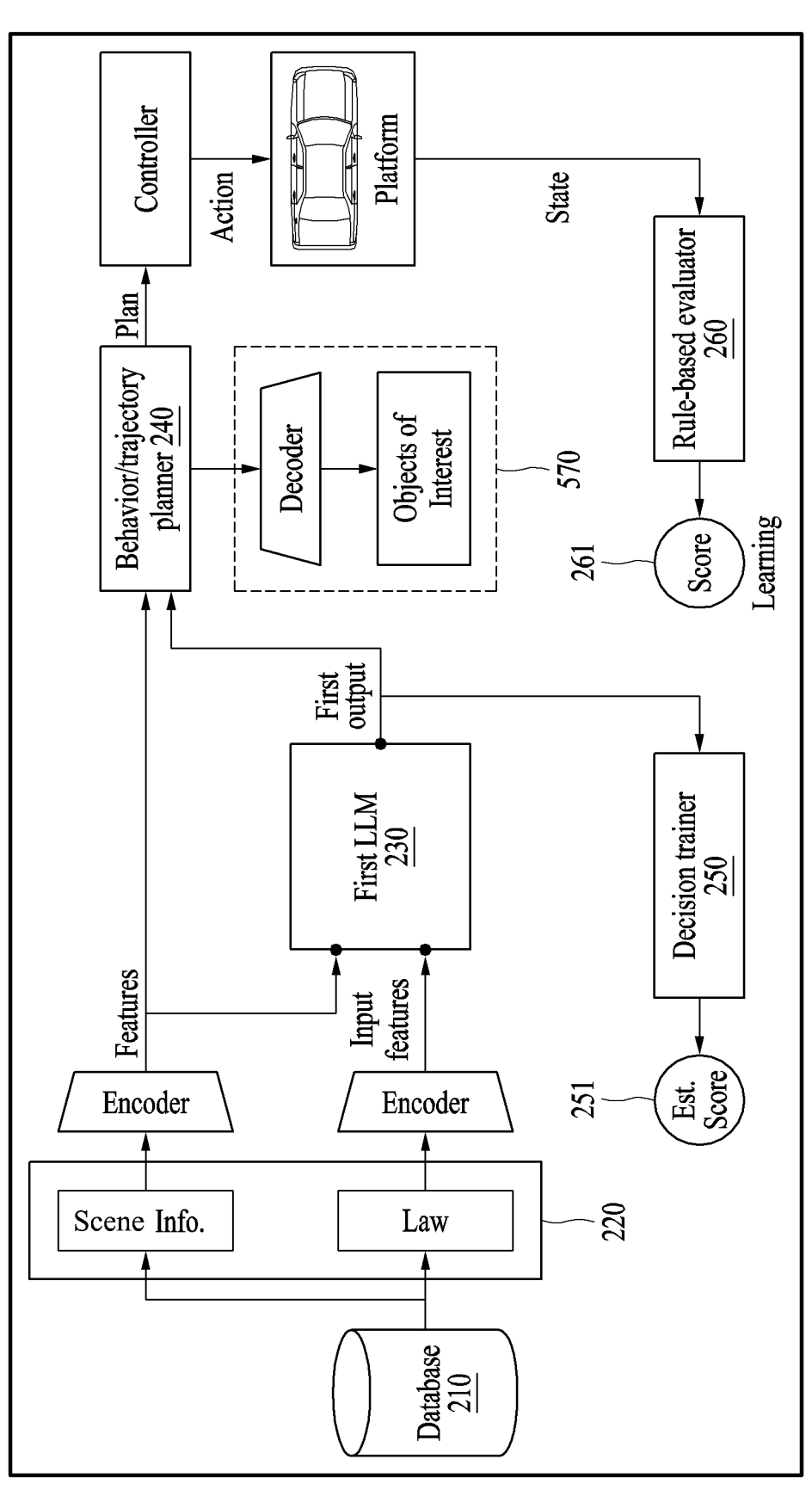
FIGS. 5 to 7 illustrate examples of a driving decision algorithm, according to one or more embodiments.
Figure 6:
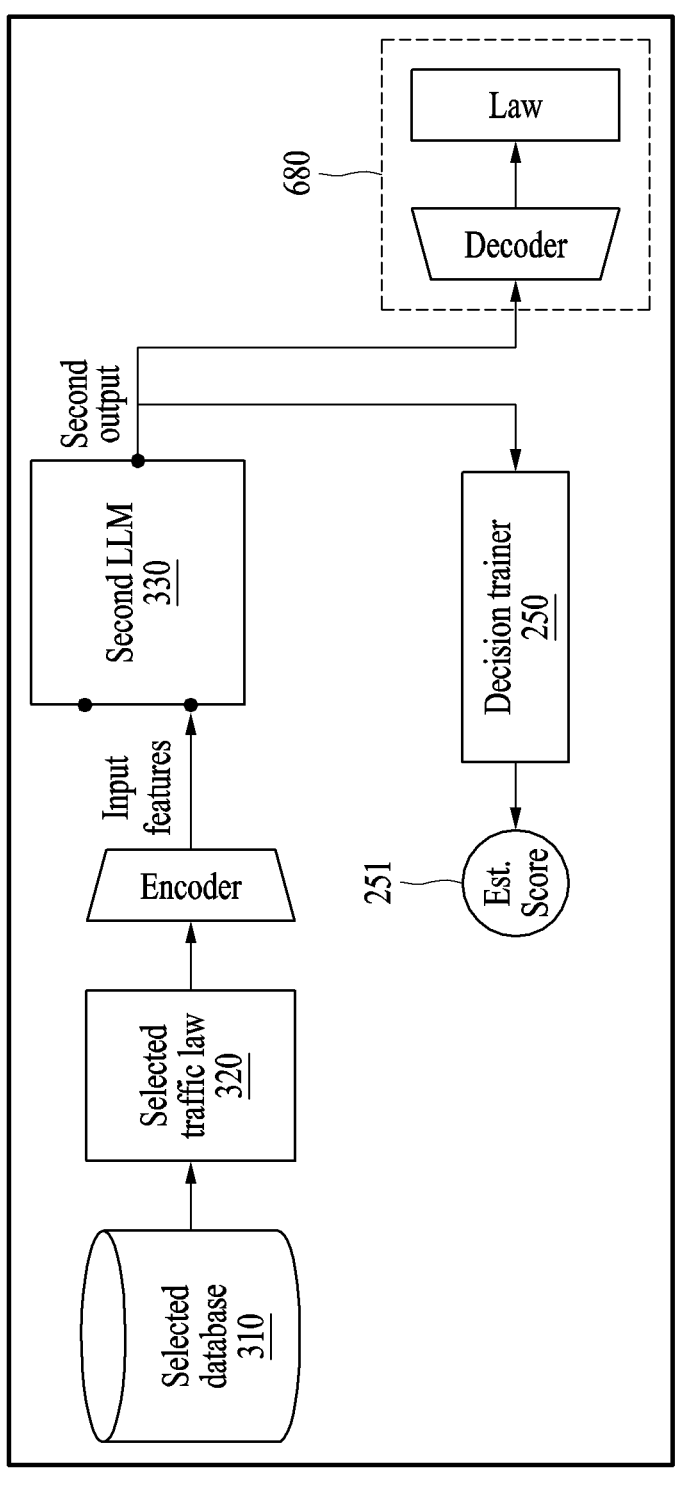
Figure 7:
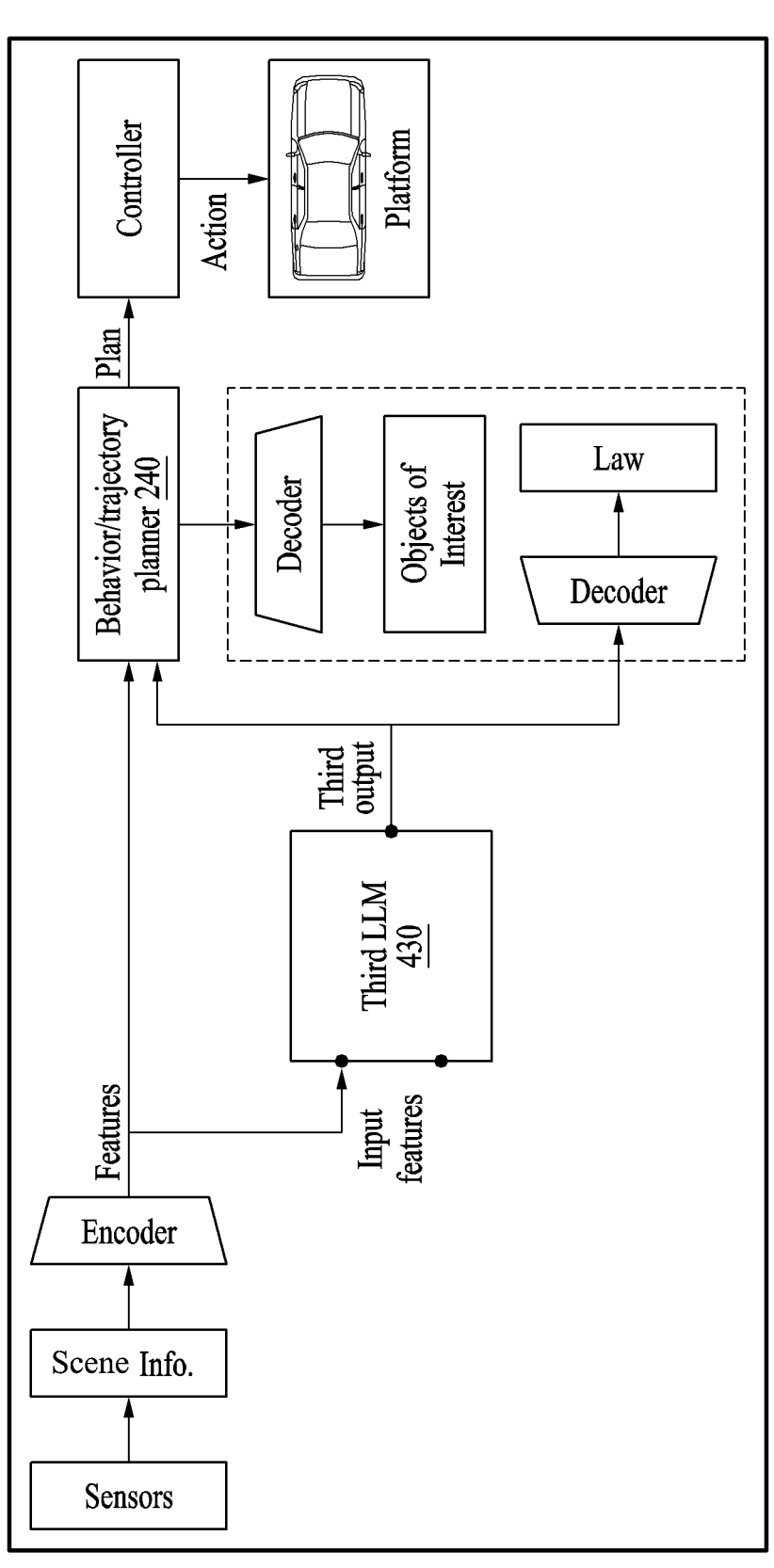

FIGS. 5 to 7 illustrate examples of a driving decision algorithm, according to one or more embodiments.

Referring to FIG. 5, the processor 930 may train an object-of-interest explorer 570 by receiving information about an object near a vehicle.

The training of the object-of-interest explorer 570 may be conducted concurrently with (e.g., as part of) the first tuning process 200. The object-of-interest explorer 570 may quantify a level of interest or importance of a surrounding object considered from (with respect to) the driving perspective of a vehicle (e.g., operating in an autonomous driving mode, a driver-assist mode, or the like). The fact that a behavior-and-trajectory planner receives information about surrounding objects during training and learns the interaction between the surrounding objects and the autonomous vehicle based on an output of the first LLM 230 may be utilized, as described next.

For example, when using a transformer neural network for the behavior-and-trajectory planner, it may be possible to (i) obtain an attention score for a surrounding object during the process of planning a behavior and a trajectory and (ii) calculate the level of interest for the surrounding object through the process of decoding the attention score.

Referring to FIG. 6, the processor 930 may receive an inferred output of the second LLM 330 or the third LLM and based thereon may input the inferred LLM output to train a decision-basis-law extractor 680. The decision-basis-law extractor 680 may be configured to output traffic laws that have provided a basis for respective outputs of the second LLM 330 or outputs of a third LLM (e.g., laws upon which inferences of the second LLM 330 or the third LLM 330 were based). Although the term "law" is used for brief description, as noted above, the term refers to any general driving rule, not necessarily formal legal rules. In addition, as used herein, "law", depending on the context, may refer to a digital representation of a rule, for example, as expressed by text that conforms to a markup language (e.g., declarative, hypertext, etc.), as expressed by ordinary language text, and so forth. In another implementation, the law may be represented by a code that is included in a mapping/index that maps codes to laws.

The decision-basis-law extractor 680 may undergo training simultaneously with (as part of) the first tuning process 200 and the second tuning process 300. In the process of training the first LLM 230 or the second LLM 330, the decision-basis-law extractor 680 may restore a traffic law previously inputted to one of the LLMs by decoding the first output or the second output, as the case may be. A decoder of the decision-basis-law extractor 680 may be trained in a way that minimizes a difference between the traffic law input into the first LLM 230 and the second LLM 330 (or third LLM) and the decoder. An output of the trained decoder may be top-N relevant laws with the highest scores among various laws that provide the basis for a driving decision. In some implementations, the top-N relevant laws may be displayed by a user interface of the vehicle, e.g., to enable a user to select a relevant law to be confirmed or applied.

Referring to FIG. 7, the processor 930 may control an autonomous vehicle by applying (i) scene information received from sensor data (e.g., in encoded form) in the process of actual driving (or driving assistance) of the vehicle to (ii) the object-of-interest explorer 570 and the decision-basis-law extractor 680. In other words, a third output of a third LLM may be transmitted to both a behavior-and-trajectory planner and the decision-basis-law extractor 680, and an output of the behavior-and-trajectory planner may be transmitted to the object-of-interest explorer 570. Finally, the processor 930 may enable autonomous driving (or other driving functions) that comprehends road traffic laws and provides additional safety to passengers and additional flexibility to the driving system.

Figure 8:
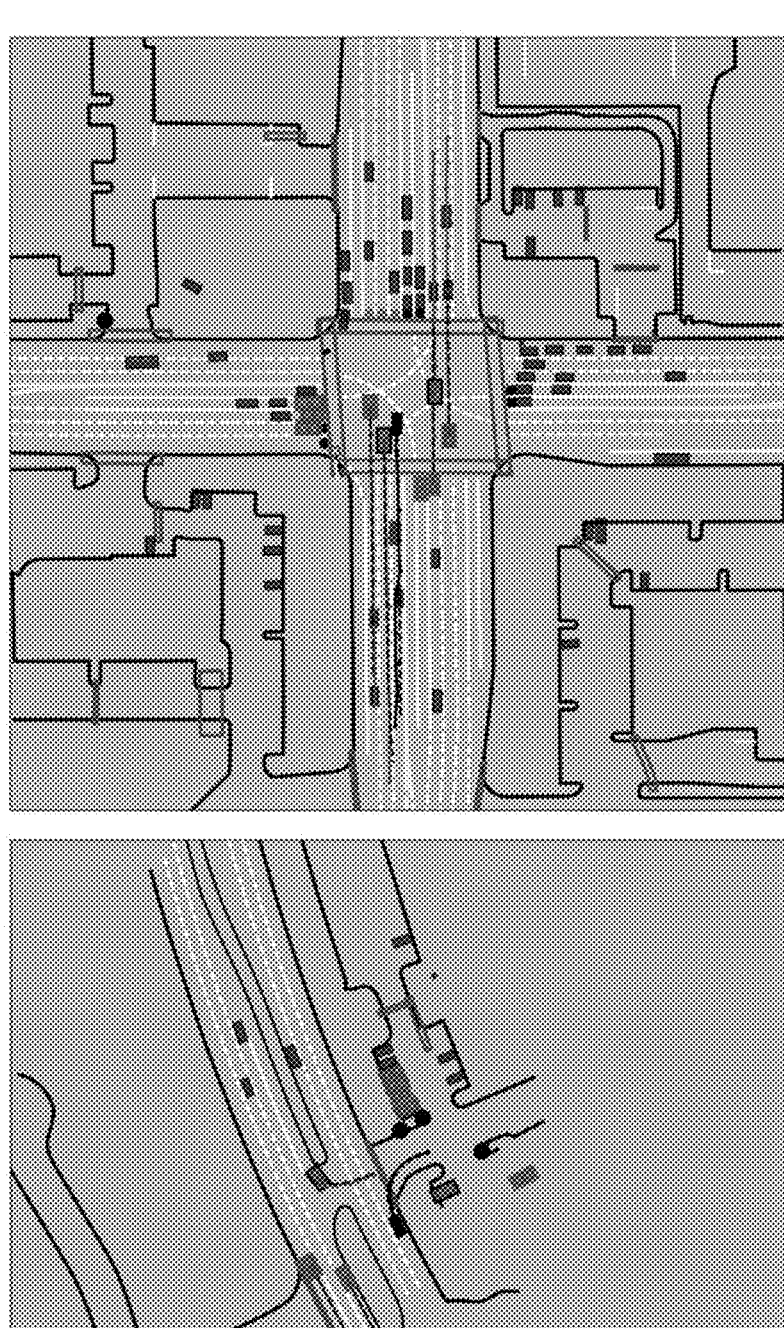
FIG. 8 illustrates an example of visualizing an operation of a driving decision algorithm, according to one or more embodiments.

FIG. 8 illustrates an example of visualizing an operation of a driving decision algorithm, according to one or more embodiments.

Referring to FIG. 8, the processor 930 may generate and present the basis (e.g., rules/laws) for a decision from an LLM (as described above), thus allowing a user to verify the basis. Through the process described above, a vehicle may comply with road traffic laws, adapt efficiently to revisions to traffic laws, possibly in different regions, and drive itself in accordance with road traffic laws for each region. Additionally, enhancing the explainability of a driving algorithm may be achieved by generating legal bases for driving decisions. Accordingly, when accidents or hazardous situations occur, providing the decision-basis for the behavior of the autonomous vehicle may aid in reviewing accidents and taking appropriate actions afterward. In addition, providing a graphical user interface (GUI) may enhance passengers' psychological sense of security.

Figure 9:
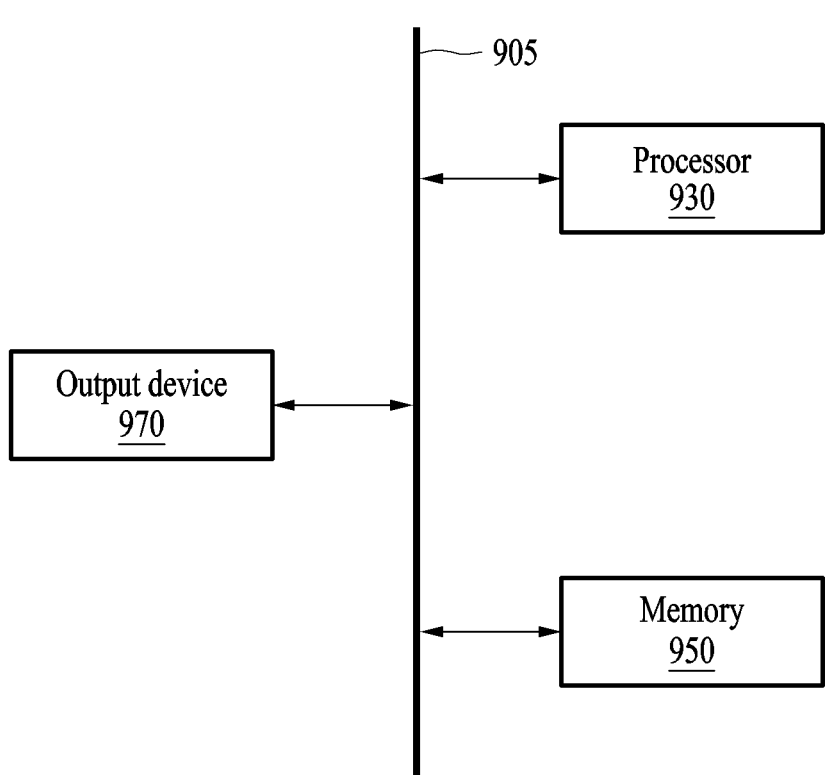
FIG. 9 illustrates an example electronic device, according to one or more embodiments.

FIG. 9 illustrates an example electronic device, according to one or more embodiments.

Referring to FIG. 9, an electronic device 900 (e.g., an autonomous vehicle and a server) may include the processor 930, a memory 950, and an output device 970 (e.g., a display). In practice, the processor 930 may be a combination of processing devices, e.g., a central processing unit, an accelerator, and/or the like (described later). The processor 930, the memory 950, and the output device 970 may be connected to one another through a communication bus 905. In the process described above, for ease of description, the electronic device 900 may include the processor 930 for performing the at least one method described above or an algorithm corresponding to the at least one method.

The output device 970 may display a user interface that receives a user input related to autonomous driving states and operation provided by the processor 930.

The memory 950 may store data obtained from a driving decision algorithm, a sensor, and a communicator performed by the processor 930. Furthermore, the memory 950 may store a variety of information generated in the processing process of the processor 930 described above. In addition, the memory 950 may store a variety of data and programs. The memory 950 may include, for example, a volatile memory or a non-volatile memory. The memory 950 may include a high-capacity storage medium such as a hard disk to store a variety of data.

In addition, the processor 930 may perform at least one of the methods described with reference to FIGS. 1 to 8 or an algorithm corresponding to at least one of the methods. The processor 930 may be a data processing device implemented by hardware including a circuit having a physical structure to execute desired operations. The desired operations may include, for example, code or instructions included in a program. The processor 930 may include, for example, a central processing unit (CPU), a graphics processing unit (GPU), or a neural network processing unit (NPU). The electronic device 900 that is implemented as hardware may include, for example, a microprocessor, a CPU, a processor core, a multi-core processor, a multiprocessor, an application-specific integrated circuit (ASIC), and a field-programmable gate array (FPGA).

The processor 930 may execute a program and control the electronic device 900. Program code to be executed by the processor 930 may be stored in the memory 950.

The tuning processes and operation algorithms described above may be executed on a server and applied to an autonomous vehicle or performed within the autonomous vehicle.

For example, the server may receive scene information from the autonomous vehicle, input the information into a third LLM, and transmit a control signal to the autonomous vehicle through a behavior-and-trajectory planner.

In another example, the autonomous vehicle may include a processor including the third LLM and the behavior-and-trajectory planner. The processor may receive scene information from sensor data of the autonomous vehicle and use the information as the input of the third LLM to control the autonomous vehicle through the behavior-and-trajectory planner.

Any of the models, e.g., the LLMs, may be implemented as neural network. Such a neural network may include interconnected layers of nodes, e.g., an input layer, hidden layers, and an output layer. The nodes of a layer may be connected to an adjacent layer, and connections between the nodes may have respective weights, which may be updated by the learning/training processes described above. The training, e.g., weight updating, described above may be performed, for example, by loss/error based back-propagation through the models (e.g., neural networks).

The computing apparatuses, the vehicles, the electronic devices, the processors, the memories, the image sensors, the vehicle/operation function hardware, the advanced driver assist systems (ADAS) and assisted driving (AD) systems, the displays, the information output system and hardware, the storage devices, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROM, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of learning a driving-decision algorithm for a vehicle, the method comprising:
   receiving a dataset related to driving from a database in which a driving scenario is stored, the dataset including text descriptions of traffic rules;
   obtaining a first output by inputting the dataset, or an encoding thereof, into a first large language model (LLM), wherein the first output comprises an inference of the first LLM based on the dataset, wherein the first LLM is configured to perform an inference when scene information is inputted thereto and traffic rule information is not inputted thereto, wherein the first LLM is configured to perform an inference when scene information and traffic rule information is not inputted thereto, and wherein the first LLM is configured to perform inference when both scene information and traffic rule information are inputted thereto;

training a decision-trainer based on the first output and training a behavior-and-trajectory planner based on the first output;

generating a second LLM by training the first LLM based on a predicted score generated by the decision-trainer based on the first output;

generating a third LLM by updating the second LLM based on the trained decision-trainer and based on a selected traffic rule; and controlling driving of the vehicle using the third LLM.

2. The method of claim 1, wherein the behavior-and-trajectory planner is configured to output a control signal for controlling a vehicle using, as an input, the first output and scene information about a setting of the vehicle.

3. The method of claim 2, wherein the training of the behavior-and-trajectory planner comprises:

extracting a learning score using a rule-based evaluator for evaluating a control result of the vehicle controlled by the control signal; and based on determining that the learning score is less than a first threshold value, updating the learning score by updating the behavior-and-trajectory planner.

4. The method of claim 3, wherein the training of the decision-trainer comprises:

extracting an estimated score for the first output using the first output as an input; and updating the decision trainer based on determining that the estimated score is less than the learning score and that an estimation error of the estimated score for the learning score is greater than a second threshold value.

5. The method of claim 3, wherein the generating of the second LLM comprises, based on determining that the learning score is less than the first threshold value, updating the first LLM.

6. The method of claim 1, wherein the obtaining of the first output comprises encoding the dataset to a scene information feature vector and a traffic-rule feature vector.

7. The method of claim 1, further comprising:

training an object-of-interest explorer by receiving information about an object in a surrounding of the vehicle.

8. The method of claim 1, further comprising:

training a decision-basis-law extractor that is configured to output a traffic rule that provided a basis for an output of the second LLM and a basis for an output of the third LLM.

9. The method of claim 1, wherein the dataset comprises scene information and a traffic rule corresponding to the scene information.

10. The method of claim 1, wherein an output of the third LLM is provided to the trained behavior-and-trajectory planner using, as an input, sensor data of a sensor of the vehicle, and the updated behavior-and-trajectory planner is configured to control the vehicle by generating a control signal.

11. An electronic device comprising:

one or more processors; and

a memory storing instructions configured to cause the one or more processors to:

receive a dataset related to driving from a database in which a driving scenario is stored;

obtain a first output by inputting the dataset into a first large language model (LLM), wherein the first output comprises an inference of the first LLM based on the dataset, wherein the first LLM is configured to perform an interference when scene information is inputted thereto and traffic rule information is not inputted thereto, wherein the first LLM is configured to perform an inference when scene information and traffic rule information is not inputted thereto, and wherein the first LLM is configured to perform inference when both scene information and traffic rule information are inputted thereto;

train a decision-trainer based on the first output, and train a behavior-and-trajectory planner based on the first input;

generate a second LLM by training the first LLM based on predicted score generated by the decision-trainer based on the first output, obtain a second LLM from the first LLM;

generate a third LLM by updating the second LLM based on the trained decision trainer and based on a selected traffic law; and controlling driving of the vehicle using the third LLM.

12. The electronic device of claim 11, wherein the behavior-and-trajectory planner is configured to output a control signal for controlling a vehicle using, as an input, the first output and scene information about a setting of a vehicle in which the electronic device is comprised.

13. The electronic device of claim 12, wherein the instructions are further configured to cause the one or more processors to:

extract a learning score using a rule-based evaluator for evaluating a control result of the vehicle controlled by the control signal; and based on a determination that the learning score being less than a first threshold value, update the learning score by updating the behavior-and-trajectory planner.

14. The electronic device of claim 13, wherein the instructions are further configured to cause the one or more processors to:

extract an estimated score for the first output using the first output as an input; and update the decision trainer based on a determination that the estimated score is less than the learning score and that an estimation error of the estimated score for the learning score is greater than a second threshold value.

15. The electronic device of claim 13, wherein the instructions are further configured to cause the one or more processors to, based on a determination that the learning score is less than the first threshold value, update the first LLM.

16. The electronic device of claim 11, wherein the instructions are further configured to cause the one or more processors to encode the dataset to a scene information feature vector and a traffic law feature vector.

17. The electronic device of claim 11, wherein the instructions are further configured to cause the one or more processors to train an object-of-interest explorer by receiving information about a surrounding object of an autonomous vehicle.

18. The electronic device of claim 11, wherein the instructions are further configured to cause the one or more processors to train a decision-basis-law extractor that is configured to output a traffic rule that provided a basis for an output of the second LLM and a basis for an output of the third LLM.

19. The electronic device of claim 11, wherein an output of the third LLM is provided to an updated behavior-and-trajectory planner using, as an input, sensor data of a sensor of a vehicle in which the electronic device is comprised, and the updated behavior-and-trajectory planner is configured to control the vehicle by generating a control signal.

20. A vehicle comprising:

one or more processors;

a memory storing instructions configured to cause the one or more processors to:

display, by a display of the vehicle, a user interface for controlling the autonomous vehicle;

execute a driving-decision algorithm of the vehicle;

receive a dataset related to driving of the vehicle from a database in which a driving scenario is stored;

obtain a first output by inputting the dataset into a first large language model (LLM), wherein the first output comprises an inference of the first LLM based on the dataset, wherein the first LLM is configured to perform an inference when scene information is inputted thereto and traffic rule information is not inputted thereto, wherein the first LLM is configured to perform an inference when scene information and traffic rule information is not inputted thereto, and wherein the first LLM is configured to perform inference when both scene information and traffic rule information are inputted thereto;

based on the first output, train a decision trainer and a behavior-and-trajectory planner;

generate a second LLM by training the first LLM based on a result of the training;

generate a third LLM by updating the second LLM based on the trained decision-trainer and based on a selected traffic rule, and controlling driving of the vehicle using the third LLM.

\* \* \* \* \*